US008631375B2

(12) United States Patent  (10) Patent No.: US 8,631,375 B2
Arelt et al.  (45) Date of Patent: Jan. 14, 2014

(54) VIA SELECTION IN INTEGRATED CIRCUIT DESIGN

(75) Inventors: Robert R. Arelt, Pleasant Valley, NY (US); Jeanne P. S. Bickford, Essex Junction, VT (US); Andrew D. Huber, Poughkeepsie, NY (US); Gustavo E. Tellez, Essex Junction, VT (US); Karl W. Vinson, Jericho, VT (US); Tina Wagner, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/443,426

(22) Filed: Apr. 10, 2012

(65) Prior Publication Data

US 2013/0268908 A1    Oct. 10, 2013

(51) Int. Cl.
    *G06F 17/50*    (2006.01)
(52) U.S. Cl.
    USPC .............................. 716/119; 716/56; 716/126
(58) Field of Classification Search
    USPC ................... 716/56, 112, 118, 119, 122, 126; 438/692
    See application file for complete search history.

(56) References Cited

U.S. PATENT DOCUMENTS

| 6,413,872 B1* | 7/2002 | Kitch | 438/692 |
| 2005/0108673 A1* | 5/2005 | Ota | 716/13 |
| 2006/0265684 A1 | 11/2006 | Buehler et al. | |
| 2007/0011638 A1 | 1/2007 | Watanabe et al. | |
| 2007/0256046 A1 | 11/2007 | Pikus et al. | |
| 2008/0148210 A1 | 6/2008 | Heng et al. | |
| 2008/0256504 A1* | 10/2008 | Oishi et al. | 716/19 |
| 2008/0282210 A1 | 11/2008 | Stine et al. | |
| 2009/0113360 A1 | 4/2009 | Bickford et al. | |
| 2010/0146465 A1 | 6/2010 | Berkens et al. | |

FOREIGN PATENT DOCUMENTS

| JP | 2006178958 | 7/2006 |
| WO | 2006058560 A1 | 6/2006 |

OTHER PUBLICATIONS

Cong et al., "Advanced Routing Techniques for Nanometer IC Designs", ICCAD 2006 Routing Tutorial.
Sharma et al, "Failure Analysis-Driven Design for Manufacturability", Freescale Semiconductor, Austin, Texas.

* cited by examiner

*Primary Examiner* — Vuthe Siek
(74) *Attorney, Agent, or Firm* — Richard M. Kotulak; Hoffman Warnick LLC

(57) ABSTRACT

Solutions for efficiently implementing a via into a multi-level integrated circuit layout are disclosed. In various embodiments, a method of creating a multi-level integrated circuit layout with at least one via is disclosed, the method including: providing at least two layers of the multi-level integrated circuit layout; and selecting a via for connecting the at least two layers, wherein the selecting includes retrieving the via from a via library including a plurality of via types, the plurality of via types prioritized in the via library according to a predicted manufacturing yield for each of the plurality of vias.

20 Claims, 3 Drawing Sheets

VIA SELECTION IN INTEGRATED CIRCUIT DESIGN

FIELD OF THE INVENTION

Aspects disclosed herein relate to designing integrated circuits. More particularly, aspects of the disclosure relate to solutions for minimizing via defects when designing integrated circuits.

BACKGROUND

Conventionally, designing an integrated circuit can be a long process involving many iterations. Traditionally, this iterative process includes placing a via into an integrated circuit design, while continually running tests to verify that the via is optimally placed. When each integrated circuit layout is completed, the above-mentioned process is generally repeated because completed layouts often do not meet minimum desired manufacturing levels. Further, this repeated redesigning of integrated circuit layouts causes a longer design cycle and increases costs throughout.

BRIEF DESCRIPTION

Various embodiments of the invention include approaches for efficiently implementing a via in a multi-level integrated circuit layout. In one embodiment, a computer-implemented method of creating a multi-level integrated circuit layout having at least one via is disclosed. The method includes: providing at least two layers of the multi-level integrated circuit layout; and selecting a via for connecting the at least two layers, wherein the selecting includes retrieving the via from a via library including a plurality of via types, the plurality of via types prioritized in the via library according to a predicted manufacturing yield for each of the plurality of vias.

A first aspect includes a computer-implemented method for creating a multi-level integrated circuit layout, the computer-implemented method including: providing at least two layers of the multi-level integrated circuit layout; and selecting a via for connecting the at least two layers, wherein the selecting includes retrieving the via from a via library including a plurality of via types, the plurality of via types prioritized in the via library according to a predicted manufacturing yield for each of the plurality of vias.

A second aspect includes a system having: at least one computing device adapted to create a multi-level integrated circuit layout, by performing actions including: providing at least two layers of the multi-level integrated circuit layout; and selecting a via for connecting the at least two layers, wherein the selected includes retrieving the via from a via library including a plurality of via types, the plurality of via types prioritized in the via library according to a predicted manufacturing yield for each of the plurality of vias.

A third aspect includes a computer program including program code embodied in at least one computer-readable storage medium, which when executed, enables a computer system for creating a multi-level integrated circuit layout, the method including: providing at least two layers of the multi-level integrated circuit layout; and selecting a via for connecting the at least two layers, wherein the selecting includes retrieving the via from a via library including a plurality of via types, the plurality of via types prioritized in the via library according to a predicted manufacturing yield for each of the plurality of vias.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
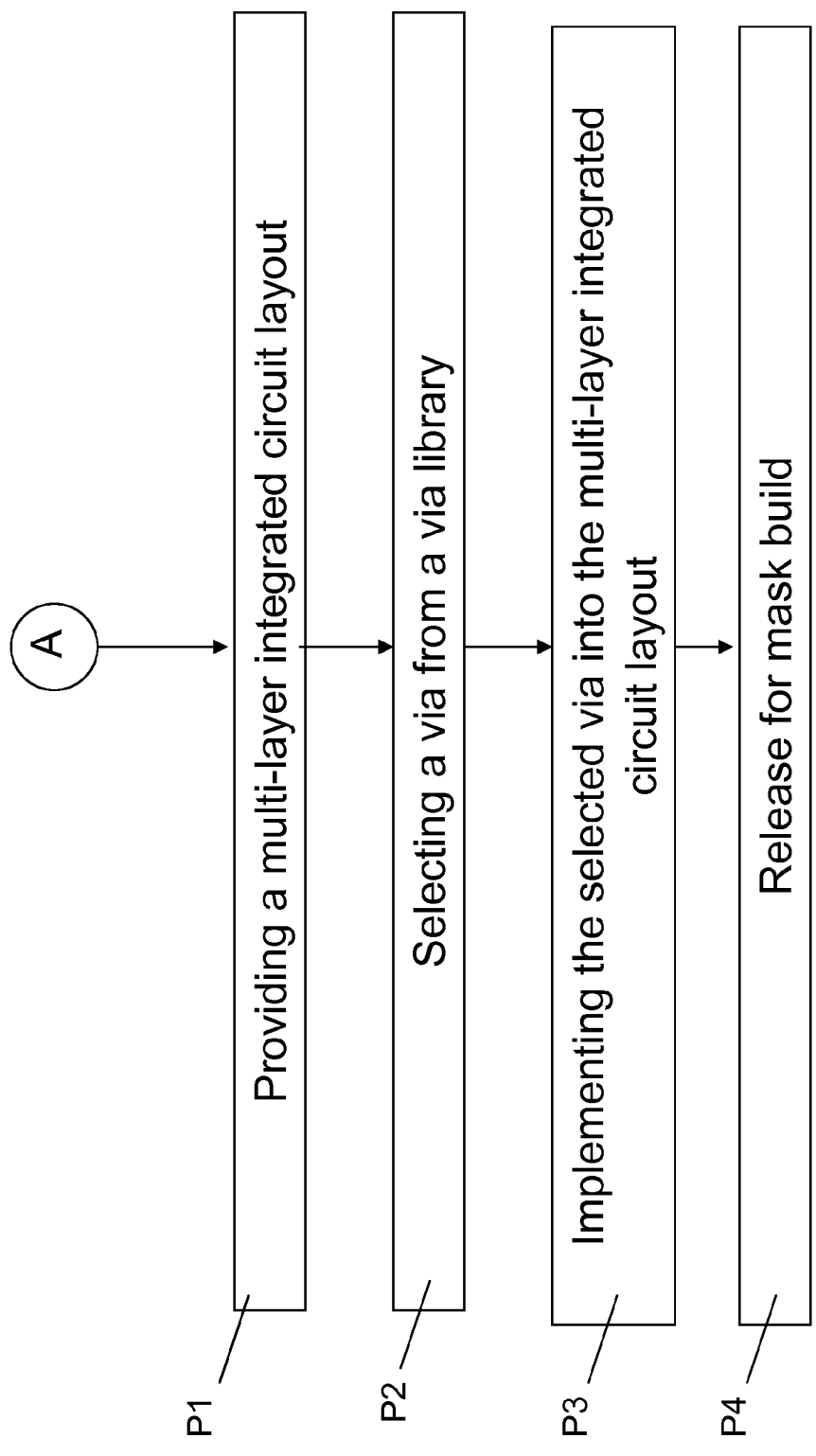
FIG. 1 shows a flow diagram illustrating processes according to various embodiments described in the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Aspects disclosed herein relate to solutions for efficiently optimizing vias for implementation in integrated circuit devices. More specifically, aspects disclosed herein relate to selecting, ranking and prioritizing an implementation of a via as to efficiently create integrated circuit layouts and minimize the effect of via defects.

Conventionally, via placement is vital to integrated circuit design, as vias facilitate communication between different layers of conductors within the integrated circuit. Generally, via defects significantly impact the long and iterative process of manufacturing and designing integrated circuits. As new integrated circuit technologies develop with denser via layers and shrinking dimensions, early technology adopters become particularly vulnerable to via defects. Generally, yield detractors for via defects are both random defect driven and systematic.

Traditionally, implementing a via into an integrated circuit layout includes repeatedly placing the via into an integrated circuit design while continually verifying optimal placement of each via. When each integrated circuit layout is completed, the above-mentioned process is generally repeated because completed layouts often do not initially meet minimum desired manufacturing levels. Further, this repeated redesigning of integrated circuit layouts causes a longer design cycle and increases costs throughout. As such, current methods result in large amounts of wasted time redesigning integrated circuits, resulting in longer turnaround time (TAT).

In contrast to conventional approaches, various aspects of the invention disclosed provide solutions for efficiently optimizing via implementation into integrated circuit layouts. Various methods include optimizing implementation of vias, by, for example, pre-processing, ranking, and prioritizing a plurality of via types for use in integrated circuit layouts. The method allows for quicker and more efficient creation of integrated circuit layouts facilitating quicker TAT (e.g., from design to production) in forming integrated circuit devices.

Various aspects disclosed herein include computer-implemented methods, systems, and computer program products for creating a multi-level integrated circuit layout. In some cases, a method includes: providing at least two layers of the multi-level integrated circuit layout and selecting a via for connecting the at least two layers of the multi-level integrated circuit layout. In various embodiments, the selecting may include retrieving the via from a via library having a plurality of via types. In some embodiments, the plurality of via types may be prioritized in the via library according to each via's respective predicted manufacturing yield. In other embodiments, via types can be prioritized according to design-for-manufacturability (DfM) parameters, such as: via routing shapes, via enclosures, and metal passthroughs. In one embodiment, the DfM routing shape prioritization can be defined using manufacturing yield pareto and identifying optimum use of white space. In other embodiments, DfM routing prioritization can be achieved by creating proposed via structures, inserting each proposed via structure into test cases, evaluating the test case layout using a yield checking simulation tool and/or systematic defect identification tool, and assigning prioritization based on white space utilization and yield impact. It is understood that a proposed via structure used in DfM routing prioritization may include different features, such as: different sizing, metal islands, extensions, and redundancies.

Referring to FIG. 1, a flow diagram is shown illustrating a process of creating a multi-level integrated circuit layout according to various embodiments of the invention. In some embodiments, the process may include, in process P1, providing a multi-layer integrated circuit layout (e.g., multi-level IC data, 150 shown in FIG. 3). This multi-level integrated circuit layout may include transistors, resistors, lines, interconnects, or any other conventional integrated circuit devices. Additionally, as its name denotes, the multi-level integrated circuit layout can include a plurality of layers, at least two of which are connected by a via. As is known in the art, an integrated circuit via can act as an inter-layer connection device which provides for electrical connectivity between two or more layers in an integrated circuit. It is understood that a multi-layer integrated circuit layout (represented in multi-level IC data 150) may include any number of layers greater than one, e.g., 2, 5, 7, etc. As noted, the multi-level integrated circuit layout requires at least one via for use in connecting at least two of its layers.

In any case, according to various embodiments, after providing the multi-layer integrated circuit layout (process P1), in process P2, the method may include selecting a via from a via library containing a plurality of via types. In some embodiments, selecting a via may include retrieving the via from a via library including a plurality of via types. In other embodiments, selecting a via may include analyzing DfM elements and determining which via fits within available white space in the integrated circuit layout. In some embodiments, a via library can be automatically loaded by the router, wherein the router selects a via type, from the via library, according to whether or not the highest priority via fits into the integrated circuit design. For example, for a given integrated circuit design, if the via with priority one does not fit, selecting the via with priority two and so on.

Following process P2, the method may proceed to process P3, which may include implementing the selected via into the multi-layer integrated circuit layout. In some embodiments, implementing the selected via may include translating the selected via into a tech file to be used by a router to implement the via on an integrated circuit board. In various embodiments, the selection of vias allowed can be included in a tech file and may be made available to the router. In various other embodiments, the prioritization of use based on yield and white space utilization can be made available. In these embodiments, the router may select a via based on the priority assigned. In a router, this selection can be set up to apply the priority to all wire codes, or can be prioritized by each wire code. In various other embodiments, the router can route using a single via (e.g., a minimum space via) and post routing optimization can be applied to swap a higher priority via for the single via in places where the higher priority via will fit in the layout. The selected via may be pre-loaded on the router, and may be operator selectable (e.g., by a user or operations program), or automatically selected according to predetermined parameters.

Following process P3, the method may proceed to process P4, which may include releasing the mask for build. In various embodiments, the integrated circuit layout is released for mask build once the integrated circuit layout is complete and vias are implemented into the layout.

Figure 2:
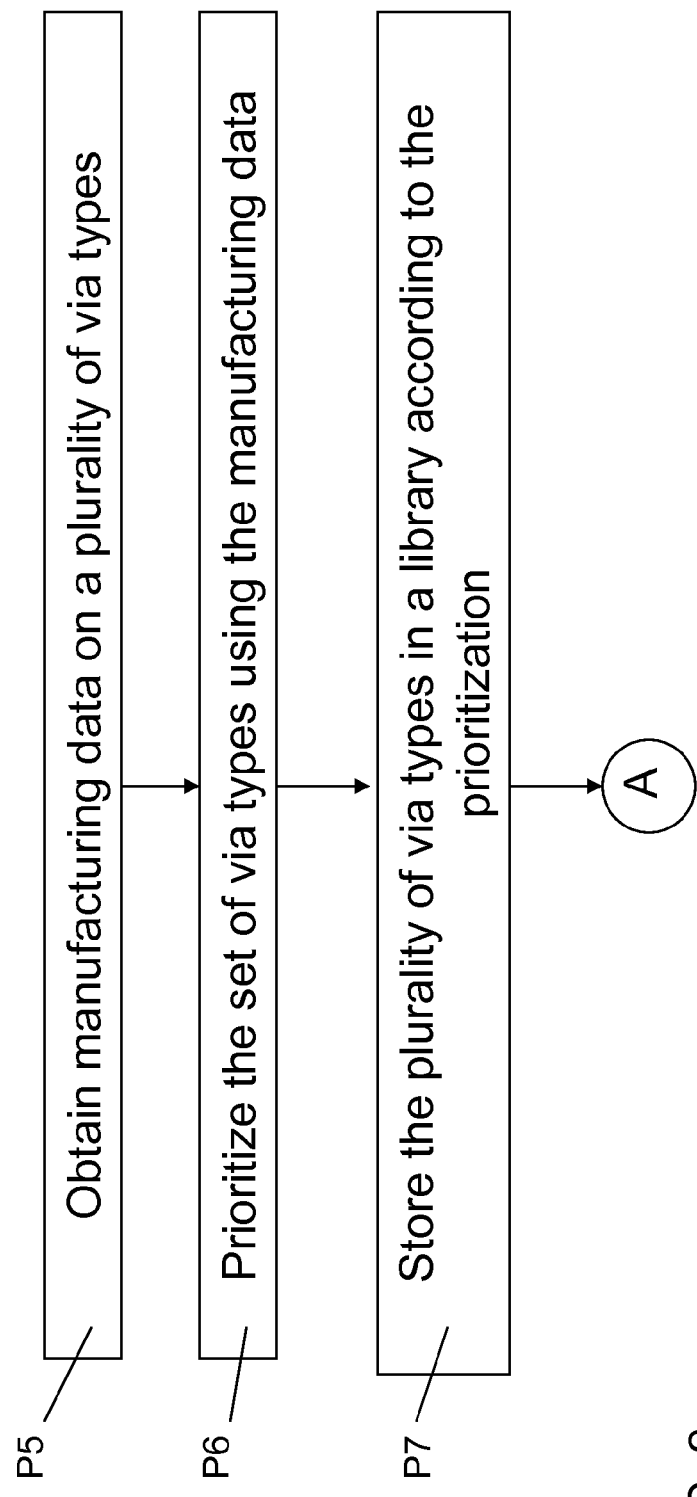
FIG. 2 shows a flow diagram illustrating processes according to various embodiments described in the disclosure.

Referring to FIG. 2, a flow diagram is shown illustrating another process according to various embodiments of the invention. In these embodiments, a method of creating a library of via types may include, in process P5, obtaining manufacturing data for a plurality of via types. In some embodiments, manufacturing data may include: electrical test macro yield data, product yield pareto, physical test macro, in line optical inspection, feature size, and product physical failure analysis. In some particular embodiments, yield sensitivity to layouts may be determined by analyzing electrical test information and in-line optical inspection information from test sites and products. In various embodiments, fails can be analyzed and the physical attributes associated with each fail are identified. In these embodiments, this information (physical failure attribute information) can be used to establish recommended rules and yield checking decks. In other embodiments, test cases may be set up using each proposed via structure, which may include different sizes, metal islands, extensions, redundancy, etc. In some embodiments, via structures can be implemented into test case layouts, where each test case layout can be evaluated using a yield checking simulation tool and/or a systematic defect identification tool. In some embodiments, manufacturing data may include simulation data created by software configured to simulate the manufacture of each via type.

Following process P5, the method may proceed to process P6, which can include prioritizing the set of via types using the manufacturing yield data. In various embodiments, the prioritizing may include evaluating each via option for manufacturing yield, and ranking and identifying each via option that provides the greatest yield benefit or assigning priority based on a combination of yield impact and white space utilization. In other embodiments, evaluating each via option can include defining manufacturing yield analysis rules within a yield analysis tool, creating via types from manufacturing data, and testing the created via types with the yield analysis tool. In those embodiments, the manufacturing yield analysis rules can be created to test for high manufacturing yield. In some embodiments, defining yield analysis tool manufacturability rules and via sets may include using physical and electrical manufacturing data to determine manufacturing yield data for each via. In other embodiments, simulation data can be used to determine manufacturing yield data. As described herein, defining via sets may include defining a layout for each via, which can include the physical dimensions of the via, a metal extension below and/or above the via, a metal passthrough, etc. In some embodiments each via may be ranked (e.g., best to worst, or vice versa) for yield based upon manufacturing yield analysis assessing sensitivity to the defects that have the highest frequency of occurrence and that cause the most yield loss, while taking into account tradeoffs for optimum white space utilization.

Following process P6, the method may proceed to process P7, which may include storing the plurality of via types in a library according to the prioritization. In various embodiments, the library may be stored within the integrated circuit processing machine (e.g. router) or externally as a component. In some embodiments, the library may be loaded into the integrated circuit processing machine using external storage (e.g. usb drive, networked drive, or other removable storage medium).

Figure 3:
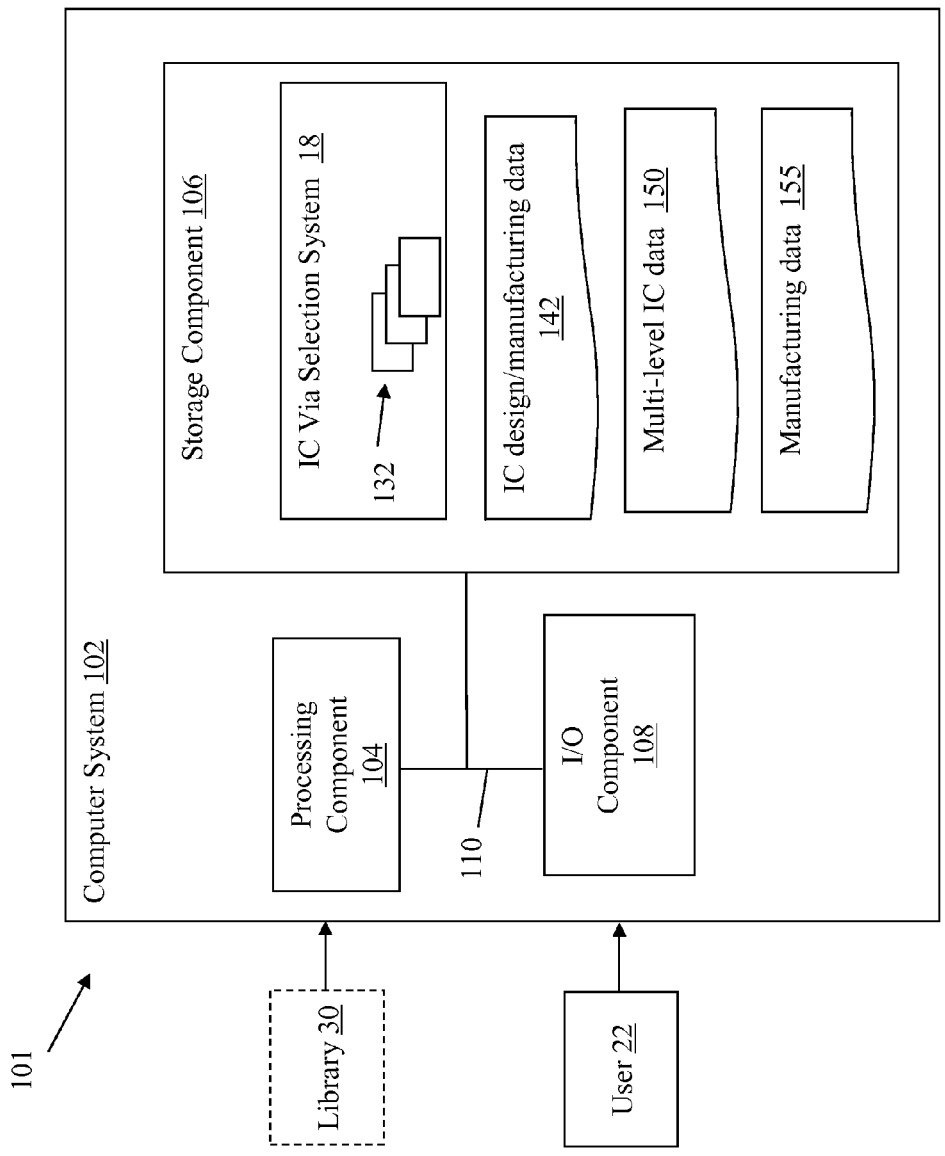
FIG. 3 shows an illustrative environment including an integrated circuit via selection system according to embodiments described in the disclosure.

FIG. 3 depicts an illustrative environment 101 for prioritizing via implementation into integrated circuits according to embodiments. To this extent, the environment 101 includes a computer system 102 that can perform a process described herein in order to prioritize via implementation in forming integrated circuits. In particular, the computer system 102 is shown as including an IC via selection system 18, which makes computer system 102 operable to prioritize via implementation in forming integrated circuits by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the IC via selection system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 22 to interact with the computer system 102 and/or one or more communications devices to enable a system user 22 to communicate with the computer system 102 using any type of communications link. To this extent, the IC via selection system 18 can manage a set of interfaces (e.g., graphical user interface(s), application program interface, etc.) that enable human and/or system users 22 to interact with the IC via selection system 18. Further, the IC via selection system 18 can manage (e.g., store, retrieve, create, manipulate, organize, present, etc.) data, such as design data (including mask-level data, task data, prioritization data, etc.) using any solution.

In any event, the computer system 102 can comprise one or more general purpose computing articles of manufacture (e.g., computing devices) capable of executing program code, such as the IC via selection system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the IC via selection system 18 can be embodied as any combination of system software and/or application software.

Further, the IC via selection system 18 can be implemented using a set of modules 132. In this case, a module 132 can enable the computer system 102 to perform a set of tasks used by the IC via selection system 18, and can be separately developed and/or implemented apart from other portions of the IC via selection system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of IC via selection system 18 fixed thereon (e.g., one or more modules 132). However, it is understood that the computer system 102 and IC via selection system 18 are only representative of various possible equivalent computer systems that may perform a process described herein. To this extent, in other embodiments, the functionality provided by the computer system 102 and IC via selection system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as integrated circuit (IC) design data 142, multi-level IC data 150 and manufacturing data 155 using any solution. For example, the computer system 102 can generate and/or be used to retrieve IC design/manufacturing data 142, from one or more data stores, receive IC design/manufacturing data 142, from another system, send IC design/manufacturing data 142 to another system, etc. In other embodiments, the computer system 102 can generate multi-level IC data 150 and/or be used to retrieve multi-level IC data 150 from one or more data stores, receive multi-level IC data 150, from another system, send multi-level IC data 150 to another system, etc. In various embodiments, the computer system 102 can generate manufacturing data 155 and/or be used to retrieve manufacturing data 155 from one or more data stores, receive manufacturing data 155 from another system, send manufacturing data 155 to another system, etc. As noted herein, IC design/manufacturing data 142 can include data such as mask-level data outlining parameters associated with distinct mask levels of an integrated circuit. Additionally, IC design/manufacturing data 142 can include task-based data (such as tasks entered by users 22), as well as layout data.

While shown and described herein as a method and system for prioritizing via selection for the manufacture of integrated circuits, it is understood that aspects of the invention further provide various alternative embodiments. For example, in one embodiment, the invention provides a computer program fixed in at least one computer-readable medium, which when executed, enables a computer system to prioritize processes in the manufacture of integrated circuits. To this extent, the computer-readable medium includes program code, such as the IC via selection system 18 (FIG. 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the IC via selection system 18 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for prioritizing a selection of vias when forming an integrated circuit. In this case, a computer system, such as the computer system 102 (FIG. 3), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

It is understood that in some embodiments, the prioritization techniques described herein can be applied to manufacturing processes and/or general business processes conventionally handled in a first-in, first-out approach. That is, the prioritization techniques described herein (e.g., w/ respect to the IC process prioritization system 18), could be applied to the design and manufacture of a number of products, e.g., buildings, automobiles, computers, medical devices, etc. Additionally, these via selection techniques could be applied to supply chains or order sorting/processing systems. In this sense, the IC via selection system 18 described herein can be interchanged for any manufacturing process prioritization system capable of prioritizing manufacturing processes (e.g., in making automobiles, computers, medical devices, etc.). That is, as described herein, the term "integrated circuit" can be replaced with the term "manufacturing" to describe one or more manufacturing process prioritization system(s).

For example, in one embodiment, aspects of the invention provide for a computer-implemented method of prioritizing a very large scale manufacturing process, the method including: querying a database for task-based data associated with a set of manufacturing tasks; applying at least one rule to the task-based data to prioritize a first one of the set of manufacturing tasks over a second one of the set of manufacturing tasks; and providing a set of processing instructions for processing a manufactured product (e.g., an automobile part, computer part, etc.) according to the prioritization. In some cases, the method can be repeated on a predetermined cycle (e.g., defined by an administrator) to modify the prioritization. In some cases, the at least one rule can be based upon one or more of the following: an identification of a designer (e.g., a human designer of the product), a submitter (e.g., an operator of a particular input device) of the task-based data, a process level in the manufactured product or an availability of a material for manufacturing the manufactured product.

Prioritizing of the first one of the tasks over the second one of the tasks can include at least one of: determining an order of execution of the set of manufacturing tasks, biasing toward or away from a manufacturing machine based upon resources required for one of the set of manufacturing tasks, or conserving materials for one of the set of manufacturing tasks based upon a current availability or projected future availability.

In some cases, as described herein, one or more manufacturing tasks may not fall within the parameters of a predetermined rule. In this case, the method can include applying the at least one rule or an additional rule to the task-based data to prioritize a first group of the set of manufacturing tasks; and applying a first-in, first-out (FIFO) rule to a second group of the set of manufacturing tasks after the applying of the at least one rule or the additional rule. As noted, the second group can include task-based data not compatible with the at least one rule or the additional rule, wherein the set of processing instructions includes instructions to process the second group after the first group.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for creating a multi-level integrated circuit layout, performed using at least one computing device, the method comprising:

providing at least two layers of the multi-level integrated circuit layout;

selecting a via for connecting the at least two layers using the at least one computing device,
wherein the selecting includes retrieving the via from a via library including a plurality of via types, the plurality of via types prioritized in the via library according to a predicted manufacturing yield for each of the plurality of vias;
constructing the via library prior to the selecting of the via, the constructing including:
obtaining manufacturing yield data about each of the plurality of via types;
prioritizing the plurality of via types using the manufacturing yield data,
wherein the prioritizing further includes prioritizing according to an amount of white space used by each of the plurality of via types; and
storing the plurality of vias in the library according to the prioritization.

2. The method of claim 1, wherein the obtained manufacturing yield data comprises a routing shape and a design-for-manufacturing (DfM) parameter for each of the plurality of via types.

3. The method of claim 2 wherein the at least one DfM parameter is selected from a group consisting of: a via shape, a via enclosure and a metal passthrough.

4. The method of claim 1, further comprising translating the selected via into a router tech file.

5. The method of claim 1, wherein selecting includes selecting a router tech file representing the via.

6. The method of claim 1, wherein the selecting includes selecting a first via type from the via library including a plurality of via types according to whether or not the highest priority via fits into the integrated circuit design.

7. The method of claim 6, wherein, if the highest priority via does not fit into the integrated circuit design, the selecting includes selecting a second via type from the via library with a next lowest priority.

8. A system comprising:
at least one computing device adapted to create a multi-level integrated circuit layout, by performing actions comprising:
providing at least two layers of the multi-level integrated circuit layout;
selecting a via for connecting the at least two layers,
wherein the selecting includes retrieving the via from a via library including a plurality of via types, the plurality of via types prioritized in the via library according to a predicted manufacturing yield for each of the plurality of vias;
constructing the via library, the constructing including:
obtaining manufacturing yield data about each of the plurality of via types;
prioritizing the plurality of via types using the manufacturing yield data,
wherein the prioritizing further includes prioritizing according to an amount of white space used by each of the plurality of via types; and
storing the plurality of vias in the library according to the prioritization.

9. The system of claim 8, wherein the obtained manufacturing yield data comprises a routing shape and a design-for-manufacturing (DfM) parameter for each of the plurality of via types.

10. The system of claim 9 wherein the at least one DfM parameter is selected from a group consisting of: a via shape, a via enclosure and a metal passthrough.

11. The system of claim 10, wherein the selecting further includes analyzing the DfM parameter for each of the plurality of via types and determining which via in the plurality of via types fits within available white space in the multi-level integrated circuit layout.

12. The system of claim 8, wherein the at least one computing device is further adapted to perform actions comprising translating the selected via into a router tech file.

13. The system of claim 8, wherein selecting includes selecting a router tech file representing the via.

14. The method of claim 3, wherein the selecting further includes analyzing the DfM parameter for each of the plurality of via types and determining which via in the plurality of via types fits within available white space in the multi-level integrated circuit layout.

15. The system of claim 8, wherein the selecting includes selecting a first via type from the via library including a plurality of via types according to whether or not the highest priority via fits into the integrated circuit design, and
wherein, if the highest priority via does not fit into the integrated circuit design, the selecting includes selecting a second via type from the via library with a next lowest priority,
wherein the second via type is distinct from the first via type.

16. A computer program comprising program code embodied in at least one non-transitory computer-readable medium, which when executed, enables a computer system for creating a multi-level integrated circuit layout, the method comprising:
providing at least two layers of the multi-level integrated circuit layout; and
selecting a via for connecting the at least two layers,
wherein the selecting includes retrieving the via from a via library including a plurality of via types, the plurality of via types prioritized in the via library according to a predicted manufacturing yield for each of the plurality of vias,
constructing the via library, the constructing including:
obtaining manufacturing yield data about each of the plurality of via types;
prioritizing the plurality of via types using the manufacturing yield data,
wherein the prioritizing further includes prioritizing according to an amount of white space used by each of the plurality of via types; and
storing the plurality of vias in the library according to the prioritization.

17. The computer program of claim 16, wherein the obtained manufacturing yield data comprises a routing shape and a design-for-manufacturing (DfM) parameter for each of the plurality of via types.

18. The computer program of claim 17 wherein the at least one DfM parameter is selected from a group consisting of: a via shape, a via enclosure and a metal passthrough.

19. The computer program of claim 16, further comprising translating the selected via into a router tech file.

20. The computer program of claim 16, wherein the selecting includes selecting a first via type from the via library including a plurality of via types according to whether or not the highest priority via fits into the integrated circuit design, and
wherein, if the highest priority via does not fit into the integrated circuit design, the selecting includes selecting a second via type from the via library with a next lowest priority, wherein the second via type is distinct from the first via type.

* * * * *